United States Patent
Luzzato et al.

(10) Patent No.: US 10,363,693 B2
(45) Date of Patent: Jul. 30, 2019

(54) METHOD FOR MANUFACTURING A PLUG FOR A CONTAINER NECK

(71) Applicant: Novembal USA Inc., Edison, NJ (US)

(72) Inventors: Michel Luzzato, Ecully (FR); Anthony Gaillard, Villeneuve (FR); Fabien Flamand, Saint Bernard (FR); Ronald Kirk Dodd, Fort Smith, AR (US)

(73) Assignee: Novembal USA Inc., Edison, NJ (US)

( * ) Notice: Subject to any disclaimer, the term of this patent is extended or adjusted under 35 U.S.C. 154(b) by 238 days.

(21) Appl. No.: 15/308,501

(22) PCT Filed: May 11, 2015

(86) PCT No.: PCT/EP2015/060274
§ 371 (c)(1),
(2) Date: Nov. 2, 2016

(87) PCT Pub. No.: WO2015/173159
PCT Pub. Date: Nov. 19, 2015

(65) Prior Publication Data
US 2017/0066164 A1    Mar. 9, 2017

Related U.S. Application Data

(60) Provisional application No. 61/992,001, filed on May 12, 2014.

(30) Foreign Application Priority Data

May 21, 2014   (FR) ...................... 14 54554

(51) Int. Cl.
*B26F 1/00*       (2006.01)
*B29L 1/00*       (2006.01)
(Continued)

(52) U.S. Cl.
CPC ........ *B29C 45/0081* (2013.01); *B26F 1/0023* (2013.01); *B29C 45/0055* (2013.01);
(Continued)

(58) Field of Classification Search
CPC .................... B29C 45/0081; B29C 2045/0056
See application file for complete search history.

(56) References Cited

U.S. PATENT DOCUMENTS 4,503,986 A * 3/1985 Nixdorff ............ B65D 41/3457
215/252
5,846,471 A * 12/1998 Thakor ............... B29C 45/0055
264/296

(Continued)

FOREIGN PATENT DOCUMENTS

EP          1243520 A1 *  9/2002  ................ B26F 1/18
WO     WO-9917911 A1 *  4/1999  ................ B26D 3/08
WO   WO-2012175663 A1 * 12/2012  ............. B65D 47/08

OTHER PUBLICATIONS

French Search Report, dated Jan. 15, 2015, 2 pages.
(Continued)

*Primary Examiner* — Nahida Sultana
*Assistant Examiner* — George W. Brady
(74) *Attorney, Agent, or Firm* — Finnegan, Henderson, Farabow, Garrett & Dunner LLP (57) ABSTRACT

The present disclosure relates to a manufacturing method for a plug for a container neck. In one implementation, a skirt of the plug is molded and provided with an attachment device adapted to removably attach to the container neck and with a permanent retention strip around the container neck. The retention strip is adapted to pass, by folding, from a molding configuration to an operating configuration. A peripheral break line is then cut out in the skirt, adapted so as to be broken during the first opening of the plug. In some implementations, the retention strip may be prefolded and
(Continued)

thereby pass from a molding configuration to an intermediate prefolded configuration. The retention strip is then folded until it passes into an operating configuration. In some implementations, the folding of the retention strip may pass the retention strip from an intermediate prefolded configuration to an operating configuration.

12 Claims, 4 Drawing Sheets

(51) Int. Cl.
      *B29L 31/56*     (2006.01)
      *B65D 41/34*     (2006.01)
      *B29C 45/00*     (2006.01)
      *B29L 23/00*     (2006.01)
      *B29K 23/00*     (2006.01)

(52) U.S. Cl.
     CPC ...... *B65D 41/3423* (2013.01); *B26F 2210/04* (2013.01); *B29C 2045/0056* (2013.01); *B29C 2045/0058* (2013.01); *B29K 2023/06* (2013.01); *B29K 2023/10* (2013.01); *B29L 2001/00* (2013.01); *B29L 2031/565* (2013.01)

(56) References Cited

U.S. PATENT DOCUMENTS

| | | | |
|---|---|---|---|
| 2001/0002014 A1* | 5/2001 | Champagnon | B29C 45/0055 215/252 |
| 2007/0089587 A1* | 4/2007 | Liao | B26F 1/18 83/879 |
| 2008/0067718 A1 | 3/2008 | Mattice | |
| 2011/0265626 A1 | 11/2011 | Bonzi | |

OTHER PUBLICATIONS

International Search Report from the European Patent Office for International Application No. PCT/EP2015/060274 dated Aug. 12, 2015.

Written Opinion from the European Patent Office for International Application No. PCT/EP2015/060274 dated Aug. 12, 2015.

* cited by examiner

METHOD FOR MANUFACTURING A PLUG FOR A CONTAINER NECK

This application is the United States national stage entry under 35 U.S.C. § 371 of International Application No. PCT/EP2015/060274, filed on May 11, 2015 and published as WO 2015/173159 A1, which claims priority to French Patent Application No. 1454554, filed on May 21, 2014, and U.S. Provisional Application No. 61/992,001, filed on May 12, 2014. The contents of these applications are each incorporated herein by reference in their entirety.

The present invention relates to a method for manufacturing a plug for a container neck.

Generally the invention relates to plugs in molded plastic material, comprising a skirt which surrounds the neck of a container and a lower portion of which, when it is considered that this neck extends vertically with its drinking portion directed upwards, is intended to remain around the neck after the first opening of the plug, while the remainder of the skirt, i.e. its upper portion, is provided so as to be removable with respect to the neck, while being initially connected to the non-removable lower portion of the skirt through frangible bridges, distributed along the periphery of the skirt and able to be broken during the first opening of the plug. The break line formed by these bridges is used as a control of this first opening, to the attention of the users. Within the scope of the present invention, the nature of the removable connection between the upper skirt portion and the container neck is indifferent, so that the invention both targets for example so called "snapped on" plugs, i.e. plugs which may be clipped around the neck, and screwed plugs.

The invention is more particularly interested in the case in which, a break line is cut out, i.e. it for example comprises a succession of cross cuts, cut out through the wall of the skirt and along its periphery, so as to define, between two successive cuts, one of the aforementioned frangible bridges, on the one hand and the retention of the non-removable lower portion of the skirt around the container neck is achieved by a protruding strip from the skirt, made with the latter in this same material. Obtaining the break line by cutting out is of an economical and practical interest, notably as compared with the molding of the break line, such a molding requiring the use of complex molds, for example provided with drawers. Also, resorting to the aforementioned strip for retaining the non-removable lower portion of the skirt proves to be economical and efficient, by providing molding together the skirt and the retention strip so that, at the outlet of the mold, the retention strip is directed downwards, which facilitates removal from the mold, and then under the action of an ad hoc pusher which is introduced into the inside of the skirt, the retention strip is folded upwards by folding it until an operating configuration allows it to ensure retention of the non-removable lower skirt portion by abutting against a bulge associated with the container neck. An example of such a manufacturing method is provided by US-A-2011/265626 on which is based the preamble of claim 1.

This having been said, the present tendency is to manufacture plugs for which the walls, notably the skirt, are increasingly less thick, in order to limit the amount of plastic material used, both for economical and ecological reasons. The constraints on the molding and mold-removal operations on the plugs of the type described above then lead to that, at the outlet of the mold, the retention strip extends increasingly vertically, in the downward extension of the skirt. The operation of folding the retention strip, from its molding configuration to its operating configuration, becomes increasingly delicate, in the sense that the dimension, radially to the central axis of the skirt, for interference between the retention strip and the aforementioned pusher, used for acting on the retention strip with the purpose of its folding, is increasingly small: the result of this is either an incomplete folding of the retention strip in the direction where a peripheral portion of this retention strip remains in its molding configuration, or axial squeezing of the skirt by the pusher, or of both.

In order to circumvent this problem, as a replacement of the aforementioned conventional pusher, the use of more sophisticated machines is known, including two telescopically mobile rods: a first mobile rod, surrounding the second mobile rod, encircles the skirt from the outside and is used for prefolding the retention strip so as to further tilt it relatively to the vertical and thus increase the radial dimension of its jutting out inside the skirt; and then, the second mobile rod is introduced into the inside of the skirt in order to fold the retention strip as far as its operating configuration, by interfering with the retention strip prefolded. It is understood that as compared with a conventional pusher, the second mobile rod necessarily has a smaller outer diameter, because of the presence of the first mobile rod for prefolding. The result of this is that even if the second rod effectively acts on the retention strip for folding it as far as its operating configuration, the connection area between the retention strip and the skirt is necessarily less clamped than with a conventional pusher of larger diameter: at the end of the manufacturing process, the retention strip then tends, by elasticity to leave its operating configuration to its configuration prefolded. This lack of stiffness for folding the retention strip then complicates the setting into place of the plug on the container neck, by notably increasing the interference resistance between the retention strip and the raised/recessed portions of the container neck upon plugging the latter.

The object of the invention is to propose a method for manufacturing plugs of the type mentioned above, which efficiently and economically, gives the possibility of firmly folding the retention strip of the plugs, even when the latter is quasi vertical at the outlet of the mold.

For this purpose, the object of the invention is a method for manufacturing a plug for a container neck, as defined in claim 1.

The idea at the basis of the invention is to prefold the retention strip in an intermediate configuration between its molding configuration and its operating configuration, by avoiding that this prefolding is carried out by a folding machine used for passing the retention strip as far as its operating configuration, but that this prefolding is cleverly carried out while the skirt is cut out for forming therein the break line. In this way, the total period for manufacturing the plug is not impacted by the prefolding since the latter is carried out at the same time as the cutting out of the break line. Further, once the concomitant cutting out and prefolding operations are completed, the operation for folding the retention strip as far as its operating configuration may be applied with a pusher of a large diameter, which efficiently interferes with the prefolded retention strip in order to push it back and clamp it firmly, avoiding unfolding of the retention strip by elastic return, which therefore facilitates subsequently its setting into place on a container neck for plugging the latter. The method according to the invention thus combines efficiency and performance, while being simple to apply, notably by adapting existing methods without prefolding: to do this, the tool used for cutting out the skirt is cleverly adapted so as to integrate therein for example a folder of the retention strip, which acts on the retention strip for having it pass from its molding configuration to its prefolded configuration, while a blade of this tooling cuts out in the skirt the break line.

Advantageous additional features of the manufacturing method according to the invention, taken individually or according to all the technically possible combinations, are specified in the dependent claims.

The invention will be better understood upon reading the description which follows, only given as an example and made with reference to the drawings wherein.

Figure 1:
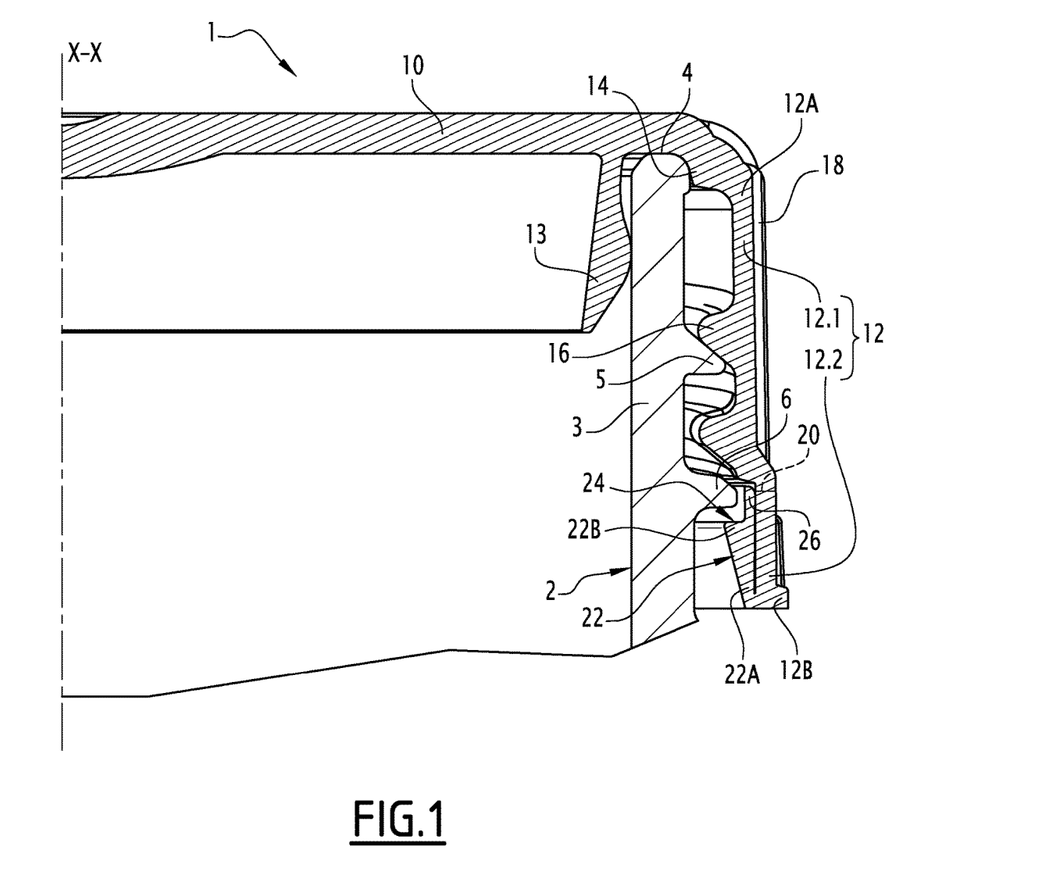
FIG. 1 is a longitudinal half-section of a plug manufactured according to the invention, this FIG. 1 illustrating the plug, not yet open, placed on a container neck.

In FIGS. 1 to 7, a plug 1 in plastic material is illustrated, designed so as to be removably added onto a container neck 2 in order to obturate the latter, the container neck 2 only being visible in FIG. 1. In practice, the container neck 2 is either made with the remainder of the container in the same material, notably when the latter is a glass or plastic bottle, or adapted so as to be permanently secured on a wall of the container, at an opening crossing this wall.

The plug 1 and the neck 2 have respective globally tubular shapes, the central longitudinal axes of which are substantially in coincidence, under the common reference X-X, when the plug 1 is added on the neck, like in FIG. 1. By convenience, the following description is oriented by considering that the terms "upper" and "top" correspond to a direction substantially parallel to the axis X-X and going from the body of the container towards its neck 2, i.e. a direction directed upwards in FIGS. 1 to 7, while the terms of "lower" and "bottom" correspond to the same direction in an opposite sense.

The container neck 2 includes a globally cylindrical body 3 with a circular base, centered on the axis X-X. At its top end, this body 3 delimits a drinking portion 4 at the level of which the liquid contained in the container is intended to be poured out. On the outer face of the body 3, the neck 2 is successively provided from top to bottom with a helical thread 5 and a bulge 6, both radially protruding outwards.

As illustrated in FIG. 1, the plug 1 is open at its lower end, while at its upper end, the plug is closed by a substantially planar bottom wall 10, at the outer periphery of which a tubular skirt 12 extends downwards, which is centered on the axis X-X and the top end of which 12A is made with the bottom wall 10 in the same material. In the exemplary embodiment considered in the Figures, the lower face of the bottom wall 10 is both provided with a protruding tubular lip 13, centered on the axis X-X and laid out inside the external skirt 12, and with a protruding heel 14, running on the outer periphery of the bottom wall: when the plug 1 is added onto the neck 2, like in FIG. 1, the bottom wall 10 extends above and through the neck, while on the one hand the skirt 12 exteriorly surrounds the body 3 and on the other hand, the lip 13 and the heel 14 are respectively sealably pressed against the interior face of this body and on the outer periphery of the drinking portion 4, in order to allow the plug 1 to sealably close the container neck 2.

The top portion of the interior face of the skirt 12 is provided with a thread 16 radially protruding inwards and mating the outer thread 5 of the container neck 2, thus allowing the plug 1 to be screwed and unscrewed on the neck. In order to facilitate grasping and a rotary drive of this plug, the top portion of the outer face of the skirt 12 is provided with protruding ribs 18, which extend in length parallel to the axis X-X and which are distributed in a substantially regular way along the outer periphery of the skirt.

During the first opening of the plug 1, the skirt 12 is provided so as to separate into two distinct portions, i.e. an upper portion 12.1, including the top end 12A of the skirt 12, and a lower portion 12.2, including the lower end 12B of the skirt, the upper 12.1 and lower 12.2 portions being initially connected to each other through a break line 20. This break line 20 runs over the whole periphery of the skirt 12, while being globally included in a plane perpendicular to the axis X-X, axially located in the running portion of the skirt 12. In FIG. 1, as well as in FIGS. 6 and 7, the break line 20 is only schematically indicated by dotted lines, it being noted that the making, during the manufacturing of the plug 1, and the making up of this break line 20 will be detailed subsequently.

In return for the breaking of the break line 20, the upper skirt portion 12.1 is provided so as to be disengaged from the container neck 2 so that this skirt portion 12.1, which may therefore be described as a removable skirt portion, is interiorly provided with the aforementioned thread 16 and exteriorly with the aforementioned ribs 18. The lower skirt portion 12.2 is, as for it, provided for remaining around the container neck 2, while thus being described as a non-removable skirt portion: for this purpose, this skirt portion 12.2 is interiorly provided with a retention strip 22 which, as detailed hereafter, is designed so as to cooperate by contact with the bulge 6 of the container neck 2 during the first unscrewing of the plug 1.

The retention strip 22 has a globally annular shape, centered on the axis X-X. An axial end 22A of the strip 22 runs over the whole of the interior periphery of the non-removable skirt portion 12.2, while being made with this skirt portion 12.2 in the same material. In the exemplary embodiment considered here, the retention strip 22 extends, from its end 22A to its opposite end 22B, from the lower end 12B of the skirt 12, the ends 22A and 12B thus being joined.

The end 22B of the retention strip 22 as for it is free: when the plug 1 is in place on the container neck 2, like in FIG. 1, the retention strip 22 occupies an operating configuration, in which the retention strip extends, from the skirt 12, to the top end 12A of the skirt 12, with its free end 22B turned towards the bottom wall 10. This free end 22B delimits a surface 24, which, when the retention strip 22 is in an operating configuration, is again found located axially just above the bulge 6 of the container neck 2 when the plug 1 is in place on this neck and thus closes the latter, as show in FIG. 1: during the first unscrewing of the plug 1, the surface 24 axially abuts upwards against the bulge 6, which retains the lower skirt portion 12.2 around the container neck. In practice, as this is well visible in FIG. 1, as long as the plug 1 is not handled with view to its first unscrewing, a play axially subsists between the surface 24 and the lower face of the bulge 6, the presence of this axial play inter alia resulting from the dimensional tolerances between the plug 1 and the container neck 2. Advantageously, the free end 22B of the retention strip 22 is also provided with a band 26, which protrudingly extends with respect to the surface 24, here being made with the remainder of the retention strip 22 and in the same material, and which is found radially interposed between the bulge 6 of the container neck 2 and the skirt 12 when the plug 1 is in place on the container neck and thus close the latter, as shown in FIG. 1: in this way, the band 26 makes the operation of the abutment surface 24 more reliable, in the sense that, in spite of the existence of the aforementioned axial play between the surface 24 and the lower face of the bulge 6, the band 26 guarantees proper positioning of the surface 24 before the first opening of the plug 1, notably upon setting into place this plug around the container neck 2, as well as efficient catching up of the aforementioned axial play upon the first opening of the plug, notably by avoiding poor axial abutment of the whole or part of the surface 24 against the bulge 6, for example due to relatively too large radial tolerances or else to a too pronounced misalignment between the respective axes of the plug 1 and of the container neck 2.

Figure 4:
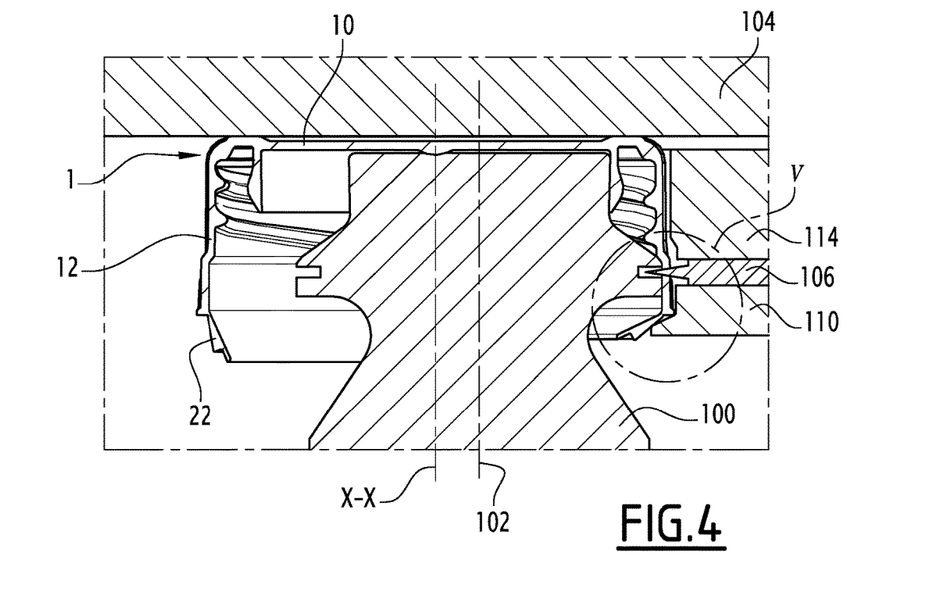
FIG. 4 is a view similar to FIG. 2, FIG. 4 illustrating a manufacturing step subsequent to the one in FIG. 1.
Figure 5:
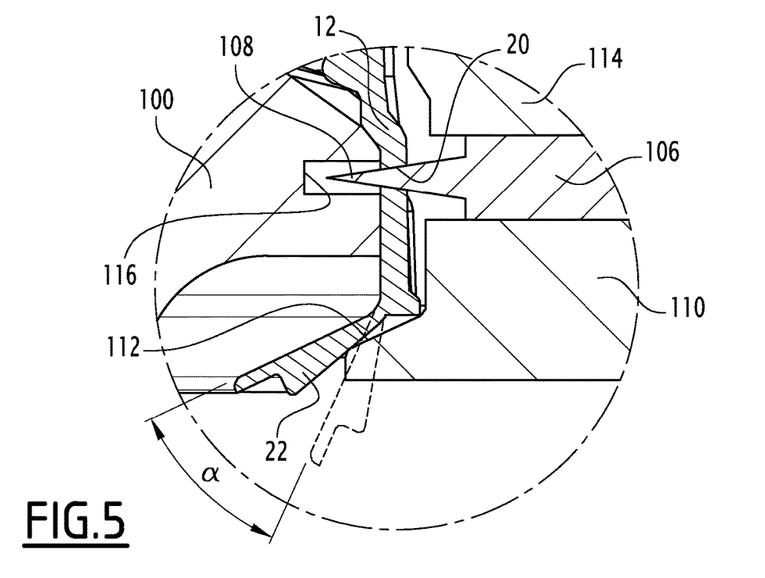
FIG. 5 is a view at a larger scale of the detail circled as V in FIG. 4.

Hereafter, an example for manufacturing the plug 1 will be described in detail, including three main, distinct and successive steps respectively associated with FIGS. 2 and 3, with FIGS. 4 and 5, and with FIGS. 6 and 7.

During the first step for manufacturing the plug 1, a plastic material such as polypropylene or polyethylene is molded in order to form as one piece, the skirt 12, with notably its thread 16, its ribs 18 and its strip 22 as well as advantageously the bottom wall 10. In practice, for this purpose a molding core and a mold block are used, delimiting an internal molding cavity in which is placed the aforementioned core during injection of the plastic material.

Figure 2:
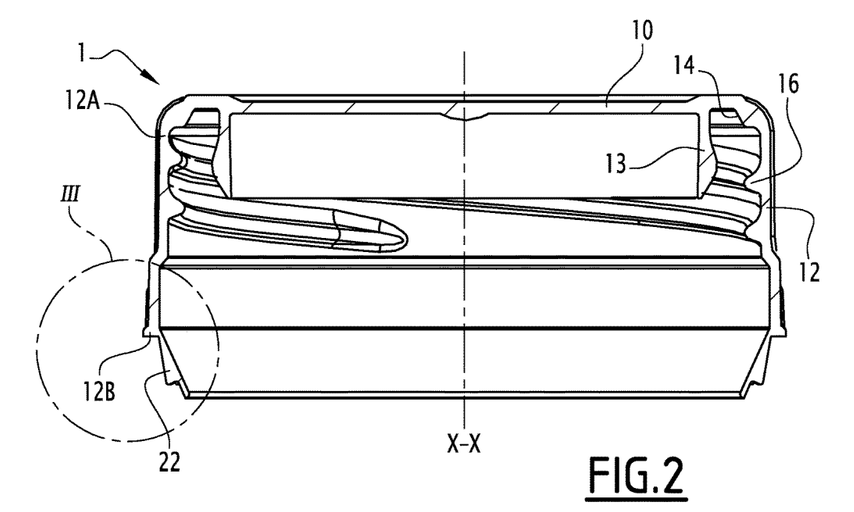
FIG. 2 is a longitudinal section of the plug of FIG. 1, this FIG. 2 illustrating the plug during manufacturing.
Figure 3:
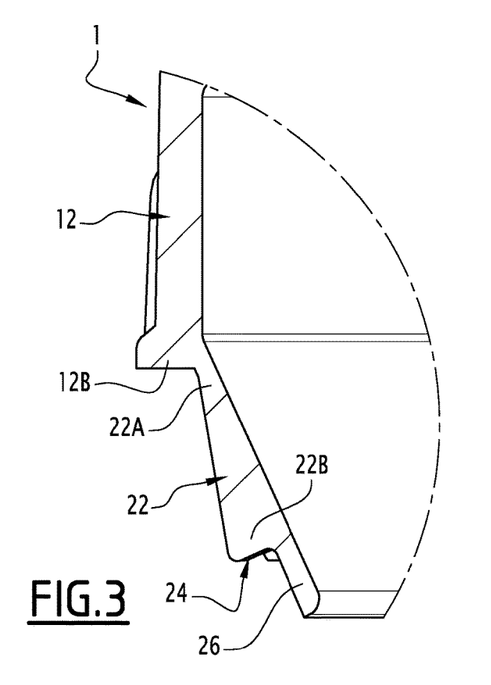
FIG. 3 is a view at a larger scale of the detail circled as III in FIG. 2.

In order to remove the plug 1 from the mold, the retention strip 22 is molded with its free end 22B directed downwards: the plug 1 as obtained at the outlet of the mold is illustrated in FIGS. 2 and 3, on which the retention strip 22 occupies a molding configuration, in which the retention strip extends, from the skirt 12, in a direction opposite to the upper end 12A of the skirt 12.

During the second step for manufacturing the plug 1, cutting out in the skirt 12 the break line 20 and the partial folding, otherwise called prefolding subsequently, of the retention strip 22 are carried out at the same time. In the exemplary embodiment considered in FIGS. 4 and 5, this second step is applied by using a dedicated machine, including:
- a mandrel 100, which may rotate on itself around its central longitudinal axis 102 and able to be partly introduced into the inside of the skirt 12;
- a supporting plate 104 forming a planar support for the bottom wall 10;
- a cutting blade 106 provided with a free sharp edge 108;
- a prefolding device 110, otherwise called a folder subsequently, delimiting a free ramp 112 which is advantageously laid out plumb with the sharp edge 108 of the blade 106 in the direction of the axis 102 of the mandrel 100; and
- a fixed frame 114, with respect to which the mandrel 100 is driven into rotation on itself and on which are fixedly secured the blade 106 and the folder 110.

In order to carry out the aforementioned cutting out and prefolding, the mandrel 100 is introduced into the inside of the skirt 12 of the plug 1, by laying out in parallel the axes X-X and 102, until the mandrel 100 axially bears upon the bottom wall 10 against the supporting plate 104. By radially shifting the axis 102 with respect to the axis X-X, the mandrel 100 presses, along a radial direction to the axis X-X, a portion of the skirt 12 both against the sharp edge 108 of the blade 106 and the ramp 112 of the folder 110. By further driving the mandrel 100 into rotation on itself around its axis 102, the skirt 12 rolls against the fixed frame 114 by rotating on itself around its axis X-X, while being radially pressed against the sharp edge 108 of the blade 106 and against the ramp 112 of the folder 110, so that simultaneously:
- the sharp edge 108 cuts out the break line 20 in the skirt 12, by crossing the wall of the latter right through radially, while retaining thin material links on either side of the break line 20, which form frangible bridges, not visible in the Figures and connecting the skirt portions 12.1 and 12.2 to each other as long as the break line 20 is not broken upon the first opening of the plug 1; and
- the ramp 112 bears, along a direction transverse to the axis X-X, upon the retention strip 22 so as to have it pass from its molding configuration, shown in FIGS. 2 and 3 to a prefolded configuration, which is shown in FIGS. 4 and 5 and which is intermediate between its molding configuration and its operating configuration shown in FIG. 1.

As regards the cutting out of the break line 20 with the blade 106, several embodiment alternatives are conceivable. As an example, in a way which is not visible in the Figures, the blade 106 is provided with recessed notches, distributed along its length, so that during its relative drive into rotation around the axis X-X between the skirt 12 and the blade 106, the sharp edge 108 touches the wall of the skirt 12, by passing right through this wall radially, while, upon the passing of each aforementioned notch, the wall of the skirt is not cut, thus forming the aforementioned frangible bridges. In this case, in order to guide the application of the blade 106, the mandrel 100 is, like in the example illustrated in the Figures, provided with a peripheral groove 116 intended to receive the end of the sharp edge 108 when the latter crosses right through the wall of the skirt 12. Another possibility consists of cutting the wall of the skirt 12 both continuously over the whole of its periphery and over the whole of its radial thickness, while leaving intact the plastic material ribs, molded and protruding from the interior face of the skirt during the molding of the latter, these ribs forming the aforementioned frangible bridges.

Also, the prefolding of the retention strip 22 by the folder 110 may be applied in diverse ways. In the exemplary embodiment considered in the Figures, the supporting ramp 112 on the retention strip 122 is formed by the free edge of a rigid typically metal plate, laid out in parallel with the blade 106. Other embodiments are conceivable, such as a functionally similar finger or part, which optionally is provided to be mobile with respect to the fixed frame 114, notably radially to the axis 102. Regardless of the embodiment of the folder 110, the action of the latter is preferentially provided so as to have the retention strip 22 pass from its molding configuration to its prefolded configuration, by tilting by at least 20°, or even by at least 30°, with respect to the skirt 12, around the junction area between the retention strip 22 and the skirt 12, globally in the fashion of a one-piece hinge connection. This tilting by at least 20°, or even by at least 30° is indicated by the angle noted as a in FIG. 5, in which the retention strip 22 in its molding configuration is partly illustrated in dotted lines.

In practice, the driving of the skirt 12 in rotation around the axis X-X may be improved by providing cooperation by mating shapes between the outer ribs 18 of the skirt and a corresponding outer sector of the frame 114.

Of course, the relative rotation between the skirt 12 on the one hand and the blade 106 and the folder 110 on the other hand, is achieved by a complete revolution of the skirt 12, so that the break line 20 is gradually cut out over the whole periphery of the skirt 12 and that the retention strip 20 is prefolded from its molding configuration to its prefolded configuration gradually over the whole periphery of the retention strip.

In practice, it is understood that the position and the angular extent of the portion of the skirt 12, which interferes with the blade 106 for cutting the skirt, do not have to be strictly identical with respectively the position and the angular extent of the portion of the skirt 12, which interferes with the folder 110 for having the retention strip 22 pass from its molding configuration to its prefolded configuration: indeed, the essential point is that, once the skirt 12 has performed a revolution on itself around its axis X-X by driving of the mandrel 100, the totality of the break line is cut out and the totality of the retention strip 22 is switched into the prefolded configuration. This having been said, preferentially the aforementioned positions are close, or even quasi identical, and the aforementioned angular extents are close, or quasi identical: such an arrangement facilitates the lay out of the tooling required for applying the second step, i.e. tooling including the mandrel 100, the supporting plate 104, the blade 106, the folder 110 and the fixed frame 114.

Figure 6:
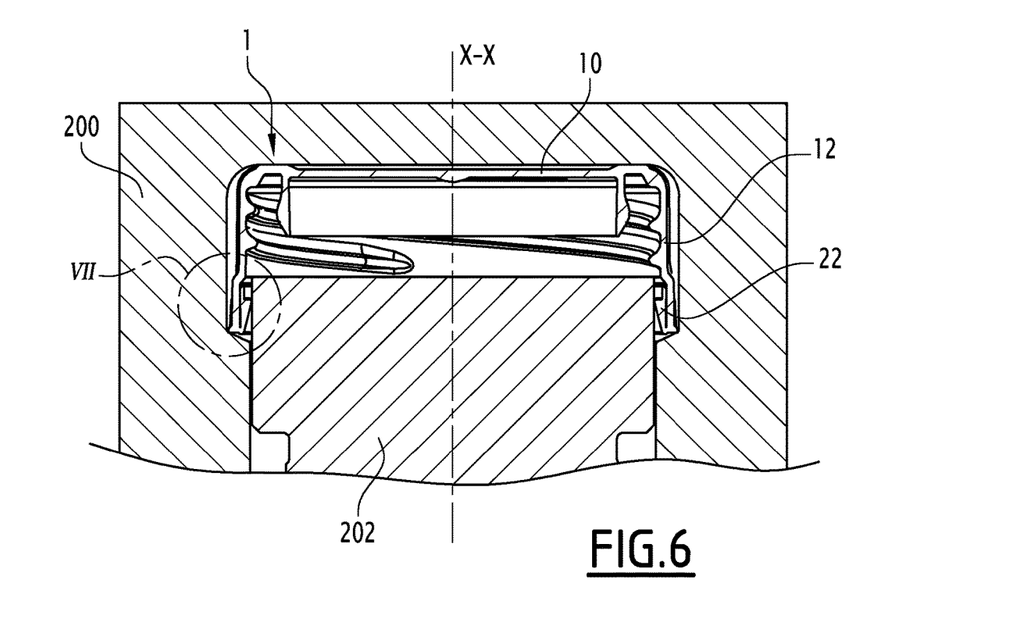
FIG. 6 is a similar view to FIGS. 2 and 4, this FIG. 6 illustrating a manufacturing step subsequent to the one shown in FIG. 4.
Figure 7:
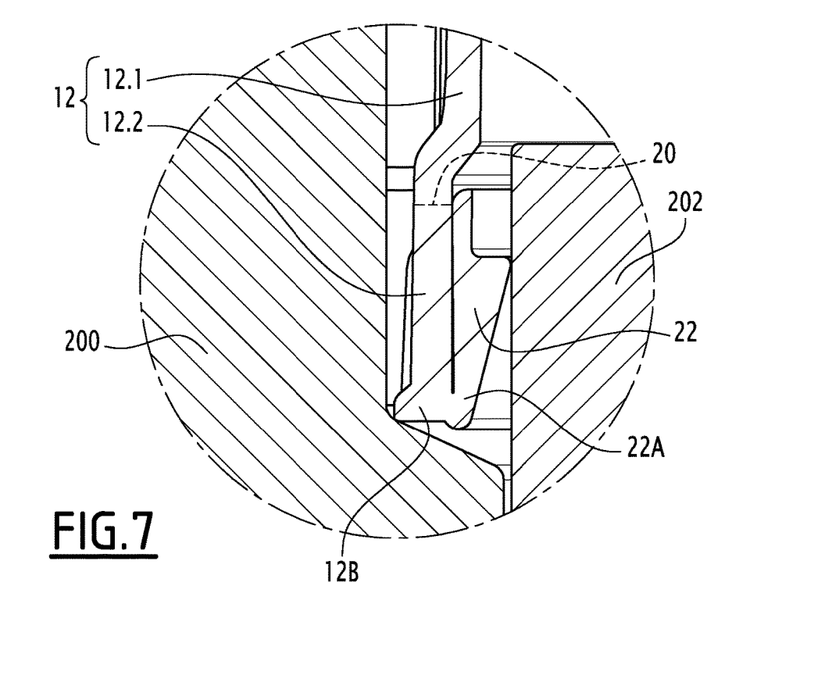
FIG. 7 is a view at a larger scale of the detail circled as VII in FIG. 6.

At the end of the second step, the plug 1 during manufacturing, is subject to a third manufacturing step, shown in FIGS. 6 and 7: in this third step, the plug 1 is immobilized in a fixed well 200 with respect to which a pusher 202 is driven in rectilinear translation along the axis X-X as far as the inside of the skirt 12 via its lower end 12B. The outer diameter of the pusher 202 is substantially equal to the inner diameter of the skirt 12, minus the thickness of the retention strip 22: in order words, as this is well visible in FIG. 7, the outer diameter of the pusher 202 is substantially equal to the inner diameter of the retention strip 22 when this strip is in its operating configuration. Therefore it is understood that at the beginning of the third step, i.e. when the retention strip 22 occupies its prefolded configuration of FIGS. 4 and 5, the retention strip 22 has an inner diameter strictly smaller than the outer diameter of the pusher 202, so that the latter interferes with the retention strip gradually as it coaxially penetrates into the inside of the skirt 12, via the low end 12B of this skirt. This interference causes the folding of the retention strip 22 from its prefolded configuration to its operating configuration, by gradual folding until it is firmly clamped from the junction area between the retention strip and the skirt. In practice, as in the exemplary embodiment considered in the Figures, this folding is achieved by tilting, with respect to the skirt, the retention strip 22 around the aforementioned junction area.

Diverse arrangements and alternatives to the manufacturing method described up to now are moreover conceivable. As examples:

it is recalled that the removable attachment of the plug 1 on the container neck 2 may be provided otherwise than by screwing, notably by clipping, the removable skirt portion 12.1 then being provided on its interior face with a ring for clipping onto a bulged edge corresponding to the container neck 2;

rather than continuously running over the whole of the periphery of the skirt 12, the retention strip 22 may be regularly interrupted along the periphery of the skirt;

the plug 1 may be integrated to a plugging assembly with several components, an over-plug may notably cover a portion of the plug 1 or else a seal washer may be added against the interior face of the bottom wall 10; and/or the non-removable skirt portion 12.2 may be extended downwards comparatively with its exemplary embodiment illustrated in the Figures, i.e. it may substantially extend below the strip 22, so as to further clad the low portion of the body 3 of the container neck 2, without however being detrimental to the performances of use of the plug 1.

The invention claimed is:

1. A method for manufacturing a plug for a container neck, comprising:
   molding a skirt of the plug,
      wherein the skirt has a tubular shape, defining a central axis and adapted to surround the container neck,
      wherein the skirt extends, along the central axis, between a first end adapted to receive an obturating device adapted to obturate the container neck and a second end opposite to the first end, and
      wherein the skirt is provided with an attachment device adapted to removably attach to the container neck and with a retention strip adapted for permanent retention around the container neck, the retention strip adapted to pass, by folding, from a molding configuration, in which the retention strip extends, from the skirt, in a direction opposite to the first end of the skirt, to an operating configuration, in which the retention strip extends from the skirt, to the first end of the skirt and is adapted to axially abut against an associated bulge of the container neck during a first opening of the plug;
   cutting in the skirt a peripheral break line adapted to be broken during the first opening of the plug, wherein the line, before the first opening of the plug, connects, along the central axis, a removable portion of the skirt, including the first end of the skirt and the attachment device, and a non-removable portion of the skirt, including the second end of the skirt and the retention strip; and
   folding the retention strip towards the first end of the skirt until the retention strip passes into the operating configuration,
      wherein cutting the peripheral break line further comprises prefolding the retention strip, wherein the prefolding causes the retention strip to pass from the molding configuration to a prefolded configuration which is in between the molding and operating configurations, and
      wherein folding the retention strip further comprises folding the strip from the prefolded configuration to the operating configuration.

2. The method according to claim 1, wherein prefolding the retention strip comprises tilting the retention by at least 20°, with respect to the skirt, around a junction area of the retention strip with the skirt.

3. The method according to claim 2, wherein prefolding the retention strip further comprises tilting the strip by at least 30° between the molding configuration of the strip and the prefolded configuration of the strip.

4. The method according to claim 2, wherein folding the retention strip further comprises tilting the retention strip with respect to the skirt, around the junction area of the retention strip with the skirt.

5. The method according to claim 1, wherein cutting the peripheral break line further comprises driving the skirt into rotation on itself around the central axis with respect to a blade adapted to cut out the break line in the skirt and a folder adapted to pass the retention strip from the molding configuration to the prefolded configuration.

6. The method according to claim 5, wherein the folder is further adapted to delimit a ramp, and the ramp is adapted to support the retention strip when passing from the molding configuration to the prefolded configuration.

7. The method according to claim 6, wherein the ramp of the folder and a sharp edge of the blade are plumb with each other in the direction of the central axis.

8. The method according to claim 1, wherein the skirt is molded so that the retention strip extends from the second end of the skirt.

9. The method according to claim 1, wherein the skirt is molded so that the retention strip continuously runs over the whole periphery of the skirt.

10. The method according to claim 1, wherein the skirt is molded so that the retention strip runs over the periphery of the skirt while being regularly interrupted.

11. The method according to claim 1, wherein the obturating device comprises a bottom wall made with the skirt using molding.

12. The method according claim 1, wherein providing the skirt with an attachment device comprises providing the skirt with at least one screwing/unscrewing thread adapted to removably attach to the container neck.

\* \* \* \* \*